UNITED STATES PATENT OFFICE.

LEON LILIENFELD, OF VIENNA, AUSTRIA, ASSIGNOR, BY MESNE ASSIGNMENTS, TO THE CHEMICAL FOUNDATION, INC., A CORPORATION OF DELAWARE.

PROCESS FOR THE MANUFACTURE OF VISCOSE.

1,355,985. Specification of Letters Patent. Patented Oct. 19, 1920.

No Drawing. Application filed January 19, 1912, Serial No. 672,119. Renewed March 16, 1920. Serial No. 366,435.

*To all whom it may concern:*

Be it known that I, Dr. LEON LILIENFELD, a subject of the Austrian Emperor, residing at No. 1 Zeltgasse, Vienna VIII, Austria, have invented certain new and useful Improvements in Processes for the Manufacture of Viscose, of which the following is a specification.

It has been assumed hitherto that two molecules of caustic soda (sodium hydroxid) to one molecule of cellulose are necessary for the manufacture of viscose; in other words, that the soda cellulose from which viscose is produced by treatment with carbon disulfid, must contain about 40 to 50 parts by weight of caustic soda to every 100 parts by weight of cellulose. (See for instance, German Patent No. 92590, or a work "*Cellulose*," by Cross & Bevan, 2nd Ed., London 1903, p. 31, etc.)

For the manufacture of viscoses poor in alkali a beginning has hitherto been made with hydrocellulose, that is, a cellulose which has been treated with dilute acids at a temperature up to 140 degrees centigrade. (See German Patent No. 92590.)

The present inventor has now made the discovery that in order to produce viscoses poor in alkali, it is not necessary to start from hydrocellulose, and that in fact ordinary cellulose is in every respect suitable for producing viscose poor in alkali which satisfies all requirements, and, as will be shown hereinafter, is actually superior in many respects to viscose produced by previous methods.

The improved process consists substantially in the manufacture of viscose by utilizing a soda-cellulose containing materially less than 36 parts of caustic soda, and preferably not more than 25.2 parts of caustic soda (or an equivalent amount of another caustic alkali) to 100 parts of cellulose.

The said soda-cellulose is obtained either by treating cellulose with an excess of soda lye of 15 to 18 per cent. strength and pressing the resulting product down to a weight amounting to from 150 to 300 parts for every 100 parts by weight of cellulose employed, or by mixing the cellulose at the beginning with the proper quantity of soda lye in a suitable and efficient mixing apparatus, for instance, a so called comminutor or disintegrator. The quantity of soda lye calculated for soda lye of 15 per cent. strength amounts to from 50 to 200 parts of soda lye to every 100 parts of cellulose (which corresponds to 7.5 to 30 parts of NaOH to 100 parts of cellulose). The further treatment of the soda cellulose with carbon disulfid, the removal, if necessary, of the excess of carbon disulfid, and the dissolving in water are effected in the usual way.

Viscose manufactured in accordance with the improved process, if the proper temperatures are maintained and the work is carefully done, is a viscous liquid free from undissolved particles and useful for all purposes for which viscose can be used.

The improved viscose is differentiated from the viscoses manufactured by the process heretofore employed, by its low percentage of contained alkali whereby the following industrial advantages are obtained:—

Articles such as fabrics, paper, or wood, &c., when treated with the improved viscose, suffer or shrink much less and become less wrinkled than when treated with viscose produced in accordance with existing processes.

The elimination of impurities, and more particularly of caustic soda from the viscose is effected much more rapidly and at less cost.

For instance if the purification of this viscose be effected by existing processes, as for example by means of acids or salts, or acids and salts, or alcohols, or acids and alcohol, or bisulfite, or carbonic acid or the like, a much less quantity of precipitating agent or agents and less washing are required than in the case of viscose made in accordance with existing processes.

Compared with ordinary viscose, the improved viscose has further the advantage that coating or printing layers, as well as films, coatings or paints, and articles of any kind, composed of the improved viscose, are much tougher, and more capable of withstanding friction and scratching, and are more elastic and supple than such coatings, layers, articles, &c., composed of ordinary viscose.

The foregoing statements apply not only to raw viscose, but also to the purified viscose, which is produced by ordinary means (precipitation by means of alcohol, salts, acids, and alcohols, acids and salts, bisulfites, carbonic acid) from viscose manufactured in accordance with the improved process. The said statements apply also to salts of viscose which are formed by treatment with the heavy metals, such as for instance zinc salts and the like.

This discovery is of great importance for all products of the coating and printing industries of which it is required that they shall be proof against rubbing and scratching and that they shall be tough and supple, for instance in the manufacture of imitation leather, imitation oil cloth, dressings of all kinds for fabrics, for textile printing and the like.

The present inventor has also discovered that the shortening or even the elimination of the maturing process of soda-cellulose produced according to the improved process may in some circumstances have a favorable effect upon the hereinbefore mentioned properties of the products.

In carrying out the improved process cellulose is mixed with six to ten times its weight of soda lye of 15 to 18 per cent. strength, and the mixture is allowed to stand for from 3 to 24 hours. The reaction mixture is then pressed by means of suitable appliances (ordinary presses or hydraulic presses) to a degree at which the weight of the pressed residue amounts to from one and one half to three times the weight of the cellulose employed. Such a mixture will contain preferably not more than 30 parts of NaOH per 100 parts of cellulose.

The pressed residue is now preferably comminuted and subjected either immediately or after a shorter or longer maturing process to the action of carbon disulfid in the usual manner. The further treatment is also effected in the usual manner.

Viscose manufactured in accordance with the improved process is suitable for all purposes for which the ordinary viscose is used. The treatment of products produced by rendering this purpose of rendering the viscose insoluble (fixing the viscose), elimination of impurities, etc., is the same as for ordinary viscose.

In coating or printing suitable materials or surfaces such as woven fabrics, paper and the like, the improved viscose is used either alone or mixed with organic or inorganic pigments or coloring substances or filling substances, or agents for giving suppleness thereto, or binding agents, separately or mixed together, so that it can be applied by hand or a machine in one or more layers on to woven fabrics or be printed thereon in the usual manner.

The rendering of the layers insoluble (regeneration of the cellulose or hydrocellulose) and the elimination of impurities therefrom are effected in the usual manner, namely by means of steam or heat or salt baths or alcohol baths or acid baths or salt and acid baths, or by storing etc. and washing.

Instead of treating the cellulose with an excess of lye, the hereinbefore described viscose may also be produced by mixing the cellulose in the beginning with only 150 to 300 parts of lye of 15 to 18 per cent. strength. In such a case it is necessary to perform the mixing from the beginning in a comminuting apparatus, for instance in a disintegrator.

The following is given for example of the manufacture of viscose according to this invention. 100 parts by weight of sulfite cellulose (for instance obtained by the Kellner-Partington process) are drenched with 600 to 900 parts by weight of soda lye of 18 per cent. strength, and allowed to remain at ordinary room temperature for from 3 to 24 hours. After this period has elapsed, the mass is pressed until the pressed residue amounts to from 150 to 240 parts by weight, (containing from 9 to 25.2 parts of NaOH per 100 parts of cellulose).

The mass is then comminuted in a suitable machine, for instance in a disintegrator or "devil" and then treated, either immediately or after being left for from 12 to 72 hours (maturing), with 4 to 8 kilograms of carbon disulfid until it can be dissolved in water to form a clear viscous liquid. If necessary, the excess of carbon disulfid is removed by blowing or suction, and the mass after the treatment with carbon disulfid is dissolved in water.

It is to be understood that cotton or soda-cellulose, etc., or materials containing cellulose may be employed instead of sulfite cellulose.

Examples of carrying out the second modification of the improved process will readily occur to any one skilled in the art.

The following are given as examples of coating or printing.

1. 10 kilograms of the above described viscose are well mixed with a suitable quantity of soot or a coloring earth, or an alkali-proof lake or a coloring matter of the indanthrene or algol or helindon series or other alkali-proof coloring matter, and the mixture is applied by hand or by a machine on to woven fabrics. This application may be done in one or more coats, as practised in the celluloid-imitation-leather industry. Finishing is then effected in the usual manner.

2. This coating mass differs from that specified under 1 only in this that it contains a suitable addition of some substance for imparting suppleness, for instance, glycerin, sugar, soap, turkey red oil, thio-derivates, such as: mercaptanes (thiols, thio-alcohols), sulfids and polysulfids of hydrocarbons and alcohols as well as of their anhydrids (alkyloxids, glycids or glycerids) and of their polymerids (pyro-bodies), salts or derivates such as ethers, mercaptals or mercaptols, esters or oxidation products (sulfuric or sulfonic or sulfo-acids, sulfoxids, sulfo-bodies ("sulfones") or the like, castor oil, india-rubber, caoutchouc or guttapercha, or other fats or oils.

3. This mass differs from the masses specified under 1 and 2 only in this that kaolin or zinc white or the like is used instead of the pigments or coloring matters mentioned therein. This mass may also be employed as a dressing for woven fabrics.

4. This mass differs from those specified under 1 to 3 only in this that instead of the pigments mentioned therein, finely ground mica is employed for the purpose of producing silky effects.

5. This mass differs from those specified under 1 to 4, only in this that no pigment or coloring matter is added.

The masses specified under 1 to 5, may also be employed for printing suitable articles or surfaces, for instance, woven fabrics, paper, leather and the like.

Having now described my invention what I claim as new and desire to secure by Letters Patent is:—

1. A process for directly preparing viscose which consists in treating cellulose which has not previously been hydrolyzed with a solution containing an amount of caustic alkali corresponding to materially less than 36 parts by weight of NaOH per 100 parts by weight of cellulose, and then subjecting the so produced alkali cellulose to the action of carbon bisulfid.

2. A process for directly preparing viscose which consists in producing an alkali cellulose by treating 100 parts of cellulose which has not previously been hydrolyzed with an amount of caustic alkali equivalent to about 25.2 parts of NaOH per 100 parts by weight of cellulose, and thereafter subjecting such alkali cellulose to the action of carbon bisulfid.

3. A process for directly preparing viscose which comprises treating 100 parts of cellulose which has not previously been hydrolyzed with an amount of caustic alkali corresponding to materially less than 36 parts of NaOH, and allowing the same to mature, and thereafter subjecting the matured alkali cellulose to the action of carbon bisulfid.

4. A process for directly preparing viscose which comprises treating 100 parts of cellulose which has not previously been hydrolyzed with an amount of caustic alkali corresponding to materially less than 36 parts by weight of NaOH, allowing the mixture to stand and mature for at least 24 hours, and thereafter subjecting the same to the action of carbon bisulfid.

In testimony whereof I affix my signature in presence of two witnesses.

LEON LILIENFELD.

Witnesses:
HERMAN WUNDERLICH,
ADA MARIA BERGER.